July 8, 1930.　　　M. M. TITTERINGTON　　　1,770,247
INDUCTOR COMPASS GENERATOR Filed Feb. 23, 1927　　2-Sheets-Sheet 1

July 8, 1930. M. M. TITTERINGTON 1,770,247
INDUCTOR COMPASS GENERATOR
Filed Feb. 23, 1927 2 Sheets-Sheet 2

Inventor
MORRIS M. TITTERINGTON
Attorneys

Patented July 8, 1930

1,770,247

UNITED STATES PATENT OFFICE

MORRIS M. TITTERINGTON, OF BROOKLYN, NEW YORK; GEORGE A. TITTERINGTON, EXECUTOR OF THE ESTATE OF SAID MORRIS M. TITTERINGTON, DECEASED, ASSIGNOR TO PIONEER INSTRUMENT COMPANY, INCORPORATED, OF BROOKLYN, NEW YORK, A CORPORATION OF NEW YORK

INDUCTOR-COMPASS GENERATOR

Application filed February 23, 1927. Serial No. 170,199.

This invention relates broadly to earth inductor compass systems and more particularly to improvements in the responsive element, i. e. the generator for the compass system; and I have produced a new and useful inductor compass generator.

This application is based upon and is a continuation in part and an improvement in part of and over my former rotary coil compass (earth inductor compass system) application Serial Number 542,937 filed March 11, 1922 wherein a complete earth inductor compass system is disclosed and claimed, but I will nevertheless describe herein the purposes and requirements of an inductor compass system to render comprehensible my present invention in a compass generator. In this present application I claim the novel generator as disclosed in my former application and I also claim the new construction and improvements in compass generators as presented in this disclosure.

An object of the invention is to produce a generator distinguished in its structure and mode of operation which includes means by which the inductor plane of the generator armature can be maintained at a zero or null position so as to cause a zero indication on a steering or deviation meter or electric direction indicator such as a galvanometer when the vehicle, on which the compass is used, is headed in a compass direction corresponding to the indicated direction on a course setting direction controller device, and to also cause the steering meter also called a deviation indicator to indicate the direction in which the vehicle turns off the course indicated by said course setting controller.

In keeping with the above stated object, I have produced a generator for use in connection with my novel inductor compass systems and in particular a generator which may be connected for use with my novel compass direction controller. To these ends, it is an object to produce novel generators having improved rotary mounting means carrying an entire generator or the commutator brushes thereof, as the case may be, in order that the generator and/or its brushes may be oriented through a complete turn from a point remote from the generator; and this novel structure includes a brush setting transmission to adjustably turn the brushes through any desired angle or through a complete turn about a normally vertical axis at the will of the operator and hold the brushes to their adjusted position.

It is also an object to produce an inductor compass generator wherein the rotary mounting means carries the commutator brushes and orients them independently of the generator, i. e. brush mounting and orienting means by which they are set in azimuth without turning the entire generator. Other objects will be apparent as the description proceeds.

In order that my compass generator be fully understood, I will disclose one or more forms thereof in working relation with a compass system which includes a compass controller and electric direction indicator or steering meter as shown in my earlier application. I will also show another form of generator including brush orienting means by which its brushes are turned in azimuth independently of the generator and its armature.

My novel inductor compass system and the compass controller having been covered and claimed elsewhere, (in the above application Serial Number 542,937, and in another application Serial Number 149,358 filed November 19, 1926) I will here claim the generator which is novel in many ways, particularly in its rotary brush mounting means by which the commutator brushes are adjustably oriented or turned in azimuth at the will of the operator, who may be remote from the generator, to show an indication on a steering meter or electric direction indicator and by which navigation is greatly aided.

In earth inductor compasses, the direction responsive element is an electric potential generator, in a way similar to an electrical dynamo except that no artificially induced magnetic field is used, the earth's magnetic flux or field being used instead. The electric potential output of such a compass generator to be impressed on an electric steering meter is dependent upon the angular relation of its brushes to the earth's magnetic flux lines. The brushes may be adjustably turned or oriented about the vertically disposed commutator to disclose two positions of maximum potential and two positions of no or zero potential upon an electric indicating device such as a galvanometer adapted as a steering or deviation meter or electric direction indicator. My generator is novel in this respect and the structural improvements by which I orient or adjustably turn the brushes through three hundred and sixty degrees at will in azimuth to locate the maximum potential brush position or dead or zero potential position for in that way I can, in a compass system, at all times determine direction or heading from my novel controller the purpose of which is to measure the angle of turn through which the commutator brushes are oriented and to directly indicate that measurement in terms of direction or heading.

Connected with the inductor compass generator are two other elements, as above suggested, and known respectively as an electric direction steering or deviation meter or indicator and a compass direction controller which constitute a complete compass. The deviation indicator is an electrical potential responsive device, as for example a galvanometer which I employ as a steering meter. The compass controller comprises, in effect, operating means adapted to be connected with the rotary armature or brush mounting means to orient the latter and is manually set or turned at the will of the operator to measure the angular position of the generator brushes about a normally vertical axis in relation to the direction in which the vehicle is headed and to directly indicate that measurement in terms of compass heading or direction and for that purpose the controller includes a calibrated dial to preferably correspond to an ordinary magnetic compass card.

With the earth inductor compass outlined, it is only necessary to know the direction corresponding to one of the zero potential positions of the generator brushes and to set, by manual or by power means, the controller dial on the desired direction, and thereafter fly, travel or steer so that the steering meter shows zero, and the craft is thus maintained in the direction shown on the compass controller.

In order to overcome the many difficulties heretofore encountered in earth inductor compasses, my invention includes rotary brush mounting means and a transmission is incorporated in said means by which the brushes are oriented at will and held fast in their new position, and also includes means to stabilize the armature. In one form of the invention the entire generator is oriented and hence the brushes; and in another form only the brushes are oriented. But in all forms of the invention falling within my principle, I prefer to stabilize the inductor plane of the generator, and one way among others to accomplish this purpose is to stabilize the armature. As a matter of structural convenience, the brushes may as well be carried with the stabilized element such as the armature when it is stabilized and hence the brushes are stabilized but that is not essential. The principle of my invention is the same for the several different forms of construction which it assumes and according to the discoveries I have made and my present understanding thereof, this general principle may be stated as follows:

The operation of the compass generator to show the exact direction at all times will be unaffected by movements of the craft upon which it is carried if the armature of the generator and the commutator brushes are so related to each other and to the earth's field, that the inductor plane of the armature is maintained perpendicular to a plane defined by the armature axis and the direction of the earth's flux. By mounting the commutator brushes dirigible in azimuth, i. e. on the aforesaid rotary or adjustably turned brush mounting means for orientation at the will of the operator, and by stabilizing the brushes, or by stabilizing the armature axis, either independently or in combination with each other, the above relations are established, controlled or maintained without serious variations therefrom while in flight. To attain this end is one of the broad purposes of the invention, and for this purpose I provide a compass controller as a fundamentally new element for use in inductor compasses to set and hold the brushes in proper position and I provide stabilizing means to maintain the armature in proper position. The controller is usually manually operated while the stabilization is continuous in performance and motor driven.

By the "inductor plane of armature" is meant a plane passing through the armature axis and having, for any particular generator, a fixed relation to the brush plane, that is, parallel to the brush plane or at some definite angle to the brush plane depending upon the type of armature winding, upon the method of connecting the armature winding to the commutator and upon the spacing between brushes. The brush plane is a plane passing through the brushes and coinciding with or lying parallel to the armature axis. The fixed position of the inductor plane with reference to the brush plane may be determined by moving the brush plane either by rotating the brushes or by rotating the armature axis or by rotating the brushes and rotating the armature axis until a galvanometer or other suitable indicator shows zero potential between the brushes. The inductor plane is then perpendicular to a plane coincident with the armature axis and lying parallel to the magnetic field.

If the armature be considered as having simple open coil windings, the "inductor plane of the armature" is the plane of any winding at the instant it reaches its mean position in circuit with the commutator brushes. If the armature be considered as having a single turn of wire connected to a single pair of commutator segments of width equal to the width of the brushes, the inductor plane of the armature is the plane of this turn of wire at the instant when the commutator segments and brushes are in matched position. If the armature be considered as having any form of winding with any number of turns of wire and any number and width of commutator segments, the inductor plane has the same fundamental relation to the brushes as in such single wire form.

The accompanying drawings illustrate practical examples and embodiments of my invention and though there are described preferred forms and operations, I claim the right of protection as to all changes and modifications as may properly come within the scope and principle of my invention.

The first four views show the compass system as divided out of my earlier application. Of these views, the first three in reality show the three elements disposed in connected and working relation by which the compass system in its entirety is understood.

The next two views show an improved form of generator wherein the rotary brush mounting means carries the commutator brushes and orients them independently of the armature. In this improvement over my earlier application, the rotary brush carrying means need not be constructed to support the armature and other generator parts.

Referring first to Figures 1 to 4 to describe an example of a generator for the compass system, an armature 151 with windings 3 on a vertical shaft M rotates in the earth's field and is journaled in an armature gyro frame 152 and in this case the armature is disposed in a normally vertical axis M—M. The armature frame 152 is suspended by gimbal pivots P in a gimbal ring 153 and is free to swing within the gimbal about the normally horizontal axis P—P to permit stabilization of the armature on the vertical axis. The gimbal ring 153 is swung on pivots 146 carried by brackets 154 and the gimbal is free to swing about this axis 146—146 to contribute to the aforesaid stabilization of the axis M—M of armature 151 in a normally vertical position since it produces its own gyroscopic force by which to stabilize itself and since the armature is carried by universally movable or pivotal means including the frame 152 and gimbal 153. The brackets 154 are carried with or upon rotary mounting means in the form of a turntable gear or subbase gear 155 which is in turn carried with or by a stationary installation base or frame 160. The rotary mounting means or gear 155 is adapted to be subjected to an adjustable turning movement in azimuth or orientation by a compass direction controller to be described.

Figures 1, 2, 3:
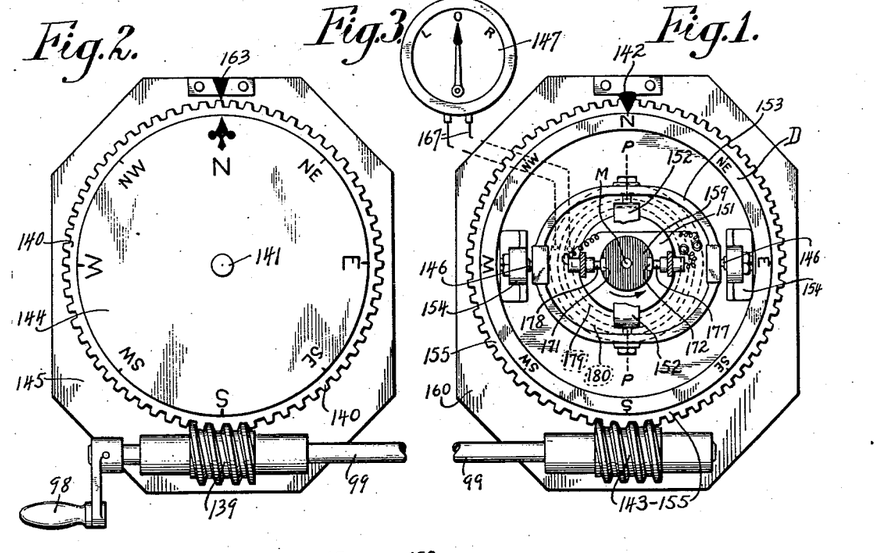
Figure 1 is a plan view of the inductor generator carried upon rotary mounting means by which the commutator brushes are oriented about a normally vertical axis and in which stabilizing means is provided to maintain the inductor plane of the armature in a given or zero position to be explained. A fragment of the controller shaft and its drive pinion or worm is shown connected to the rotary mounting means of the generator thereby forming a gear transmission included as a part of the rotary mounting means to effect a complete turn of the armature and/or its brushes.
Figure 2 is a plan view of the compass direction controller in one of its simplest forms for adjustably turning the rotary mounting means of the generator and hence the commutator brushes and located distantly from the generator. The controller includes a gear transmission and a fragment of the controller shaft is directed toward the generator and may be considered as connected with the shaft fragment at the generator, and the controller also includes means, such as a compass dial, to indicate the direction or heading of the vehicle.
Figure 3 shows the electric deviation, steering meter or direction indicator connected with the inductor generator and the hand of which, when on zero, shows that the craft is on that heading indicated by the controller compass in Figure 2.

A vertical journal pin 149 is carried in the base 160 and supports the armature and brush mounting gear 155 so the generator and/or its commutator brushes may be adjustably turned by a direction controller means shown in Figure 2 to be described, and this journal pin 149 may preferably contribute to the driving of the generator armature 151 by transmitting a power medium thereto along the line of or through the pin or concentric therewith. Also the journal means 149 may act as a center about which slip-ring current collecting brushes rotate to transmit current from the generator to the electric potential direction or steering indicator 147 shown in Figure 3 to be described, and which may be called a deviation meter or indicator. The generator frame or base 160 is adapted to be anchored on the craft in the installation of the compass system, and thus the inductor generator armature is mounted on an airplane and stabilized, and hence its current collecting brushes may be stabilized in relation to the direction of the earth's flux lines when the brushes, as in this case, are mounted directly on the generator.

The generator may be provided with direction indicating means such as a compass card or dial or graduated circle D similar to a direction controller compass-like dial to be described which facilitates readings and observations taken from the compass and this dial means is best shown in Figure 1. A lubber's line 142 is fixed so to point to the dialed rotary mounting means 155. The compass dial on the gear 155 turns uniformly at the same time and same rate as the comutator brushes turn and thereby directly indicate, in terms of compass direction, the angular movement of the commutator brushes.

Figure 4:
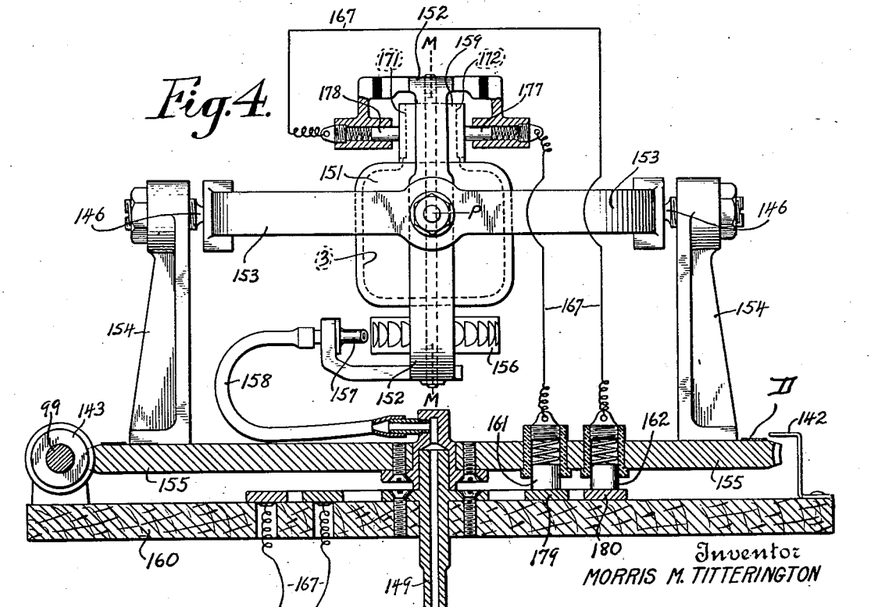
Figure 4 is a side enlarged elevation of the generator shown in Figure 1, parts thereof being in section, showing its adjustably turned or rotary mounting means carrying the generator and by which particularly its commutator brushes are oriented at will by the direction controller shown in Figure 2.

The armature 151 is driven by any suitable means, and I have shown a turbine wheel 156 fixed to the armature shaft and driven by compressed air which is directed against the wheel 156 by an air jet 157. Air is obtained from any suitable source such as an air compressor and is conveyed to the jet 157 through a rubber tube 158 from the tubular journal pin 149 through which compressed air may be transmitted to drive the generator.

Mounted on the armature shaft is a commutator 159, and for the sake of simplicity only two armature segments 171 and 172 are shown on the commutator. There is the armature coil 3 which is wound around the armature core and has its ends connected to the commutator segments 171 and 172 in any approved manner. Current collecting commutator brushes 177 and 178 are carried on the gyro frame 152 and bear on the commutator 159.

As is well known to those versed in the art, the direction of the earth's magnetic flux is only horizontal at a few locations on the earth's surface and at most places is inclined at a considerable angle to the horizontal. An inductor compass, as well as the usual type of magnetic compass, is caused to function by the horizontal component of the earth's flux. The vertical component of the earth's flux is largely responsible for the erratic action of the ordinary magnetic compass under certain conditions, and to eliminate the ill effect of the vertical component upon the compass generator of my invention, means are provided to maintain the inductor plane of the generator so as to gain maximum effect of the earth's horizontal flux lines and minimize or eliminate all effects of the vertical flux lines.

To the above ends the entire generator may be stabilized or only certain parts thereof are required to be stabilized in accordance with the principles of the invention already stated. In the forms of the invention herein disclosed, the generator armatures and brushes are stabilized together. As a matter of convenience in design and construction, the brushes 177 and 178 are in this case carried upon the stabilized generator and hence are themselves stabilized, but several variations are possible in accordance with the principle of my invention.

Wires 167 are attached to the commutator brushes 177 and 178 and connect with slip-rings 179 and 180 which are interposed between the rotary mounting means 155 and the stationary base 160. As shown, brush 177 is connected to ring 179, and brush 178 is connected to ring 180. The contacts on the slip-rings are made by slip-ring brushes 161 and 162. From the slip-rings, the wires 167 are run to an electric direction indicator or steering meter 147 shown in Figure 3, which may be a galvanometer in which electric potential in one direction causes the hand to move to the right of zero, and potential in the other direction causes the hand to move to the left of zero. The galvanometer 147 or the like is suitable for use as an electric direction indicator or steering meter as will be explained and it reads null as shown for the correct heading of the craft when ultimately attained by the pilot.

What I call a direction compass controller 145 is shown in Figure 2. It is in general a course setting instrument and it is used for orienting the generator and brush mounting gear 155, and hence the generator brushes are adjustably turned at the will of the pilot or navigator to any desired position about a normally vertical axis represented in this case by the journal pin 149. A compass dial 144 is carried with a controller gear 140 on a journal pin 141, and turns therewith or is operated thereby, and there is provided a lubber's line 163 by which to read the direction controller compass-like dial 144.

The controller gear 140 is operatively connected to the generator and brush mounting gear 155 by a suitable telemetric connection or operating means 98—99, and in this case through a shaft 99 and manually operable crank means 98 and gears 139 and 143 respectively fixed on the shaft in such a way that rotation of the direction controller dial 144 through a given angle by means of the controller crank 98, causes uniform orientation of the generator brushes 177 and 178 through the same angle about a normally vertical axis and that angle is measured and directly indicated in terms of direction at the lubber index 163 of the controller.

A navigator at the direction controller crank handle 98 may therefore from a distance manually orient the generator brushes about the vertical until the direction compass dial 144 is correctly set to show the desired direction of travel at the lubber's line 163, at which time the generator brushes 177 and 178 will be in that required position with respect to the direction of the earth's flux lines as will produce no potential and hence a null reading on the direction indicator 147 when the craft is headed on that direction as shown by the direction controller dial 144.

As already explained the rotary generator and/or brush mounting means 155 also includes a gear represented by the same reference 155 and the gear is in mesh with the drive pinion or worm 143 by which the controller shaft 99 is connected with the generator. The two gears 143 and 155 provide a gear transmission by which the rotary brush mounting means 155 is oriented from the controller 145 remotely located from the generator since the latter is installed in some out of the way place, say in the tail of the aircraft. The transmission means 143—155 locks the rotary mounting means against orientation except at the will of the operator.

The disposition of the various units on an aircraft or other vehicle and their practical operation, will now be explained. For the electrical generator unit Figures 1 and 4, a location is chosen which is as free as possible from local magnetic fields. If such local fields do exist, however, they may be compensated in precisely the same way as is well understood in respect to ordinary magnetic compasses.

To suitably install the compass, the direction controller 145 and the electric direction or deviation indicator 147 are located in positions where they may be convenient to the pilot or navigator of the craft. An electrical connection 167 is made between the direction indicator 147 and the generator brushes 177 and 178, as previously described. The direction controller gear 140 and the generator brush mounting gear 155 are mechanically connected by a flexible shaft transmission means of any approved form, and the shafting 99 usually requires universal couplings or it may be a flexible shaft.

This controller and generator interconnection is such that when the aircraft is headed north, the direction controller dial 144 then shows north at the lubber's line 163 and the inductor plane of the armature is perpendicular to a plane defined by the axis of the armature and the direction of the earth's flux, and hence the electric potential at the commutator brushes 177 and 178 is zero "0" as shown. It therefore follows that no current flows to the steering meter 147 and a null or zero reading exists which informs the pilot that the craft is on the right course, i. e. on the course shown by the direction controller dial 144 at the lubber's line 163.

In operation, the direction controller 145 is set to indicate the desired course at the lubber index 163. The generator and its brushes, being connected mechanically to orient about the journal pin 149 through the same angle as the compass controller dial 144, is therefore turned through an angle indicated in terms of direction by the controller dial 144, and doubtless the hand of the direction or deviation indicator 147 will deflect to right or left because the aircraft may not yet be on the desired course. The aircraft is then steered or guided around until the steering indicator or meter 147 shows zero, at which time the heading of the craft will then be that direction indicated at the lubber's line 163 on the controller compass dial 144, and will remain so as long as the pilot steers the craft to maintain zero on the electric meter 147.

It will be apparent that a direction 180° off the heading indicated by the controller dial would also produce a null reading on the direction and steering indicator 147 because in that event the earth's flux lines and the generator brushes are again in that relative position where no electric potential is generated. Such an error or opposite direction may be detected by steering the craft slightly to the right or left to produce a deflection of the hand on the meter 147. If a turn of the craft to the right causes the meter-hand to move to the right, the heading is correct as read from the controller dial 144. If a turn to the right causes the meter-hand to move to the left, the heading is 180° from correct, and must be corrected by reversing the direction of the craft.

Since there is no current flowing while the direction of the craft is being indicated, there is no magnetomotive force generated, no distortion of the earth's field, and consequently no error is introduced from this source, which is important and contributes to the success of my invention because it makes for a reliable indication.

While I have shown in Figures 1, 2 and 3 only one direction controller and one deviation indicator connected to the generator, in practice any number of controllers 145 and deviation indicators 147 can be used with one inductor generator, thus permitting the direction to be determined at several remotely located places, and enabling a boat or other craft to be equipped with any suitable number of steering meters 147 or controllers 145.

When used on large aircraft the electric direction deviation or steering indicator 147 is placed where it is easily observed by the pilot, while in many cases, the direction controller 145 may be placed conveniently to the navigator, perhaps at quite a distance away from the direction indicator 147 and pilot.

As far as a navigator is concerned, he determines the direction to be steered and then sets that direction on the controller dial 144 by rotating the controller handle 98 until the dial mark of direction comes to the index 163. This action orients the commutator brushes through the shaft and transmission, causing the direction indicator 147 to point to the right or to the left of its zero. The pilot then changes the course of the craft until the hand of the indicator 147 comes back to zero, thereby bringing the craft around to the new heading which the navigator has set on the controller dial 144 and signaled the pilot to follow.

It is seen that the compass system is so constructed that the navigator at the direction controller 145 may be some distance from the electric direction steering meter or deviation indicator 147, but he can signal the pilot, who is at the indicator 147, the direction to be followed, and the navigator does this by merely setting the desired direction onto the controller compass dial 144, whereupon the pilot can read the corresponding direction on the similar compass dial D made on the generator mounting gear 155 in case the generator is visible to the pilot. The controller 145 and direction indicator 147 may be placed side by side and read together and operated solely by the pilot if desired.

While I have disclosed a manually operated direction controller, I may in some cases use motor means such as an electric motor or other power means for revolving the direction controller compass dial 144 and shaft connection 99 for setting the desired heading thereon and for adjustably turning the generator and/or its brushes in azimuth.

Since the inductor plane of the armature is controlled, established or maintained perpendicular to a plane defined by the axis of the armature and the direction of the earth's flux, while the direction is being indicated, no error is introduced by the movements of the craft upon which the compass is mounted. Both sources of error which have been identified with previously proposed devices of remotely similar nature are therefore eliminated by my invention, and it fills a need felt for a reliable compass especially on airplanes.

Preferably the worm gears 139 and 143 are relatively smaller than the larger gear with which each respectively engages and thus many turns of the crank shaft means 99 is required to effect a 360 degree oriented adjustment of the compass dial and the generator brushes. Furthermore a finer and closer range or fractional degree setting of the compass controller dial 144 and generator brushes 177 and 178 may be attained if a relatively low gear reduction be employed to turn the controller and brushes. The gear reduction transmission 139—140 and 143—155 also eliminates or greatly reduces errors in the compass dial setting which would be otherwise introduced by reason of back lash in the long shafting 99 and its various connections, this object being attained by a small gear meshing with a larger one. The shafting 99 enables the compass controller and inductor generator to be remotely installed on the craft if that be desired.

A worm and worm wheel type transmission 143—155 are chosen for one form of the invention by which to turn the generator brush mounting means and hence orient the brushes because this type of transmission interlocks against accidental displacement and thus restrains the brushes against movement or orientation by vibration but instantly permit a resetting of the brushes at the will of the operator.

Figure 5:
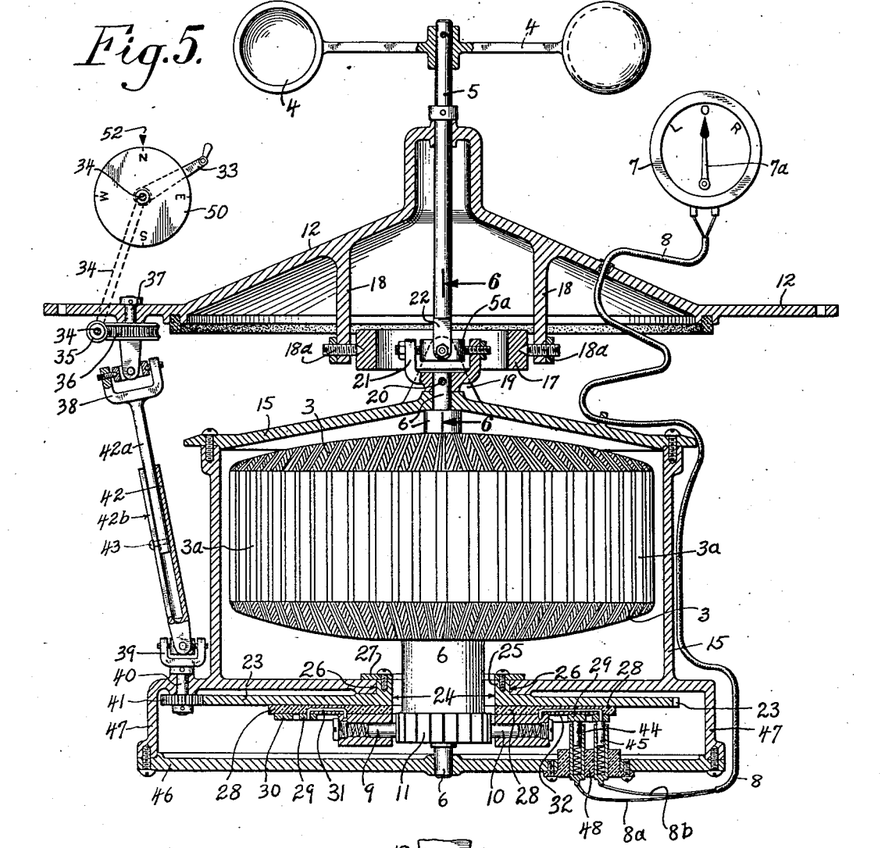
Figure 5 is a view in transverse vertical section showing the improved generator, and to facilitate an understanding of the invention, there is shown, diagrammatically, a direction controller and steering meter connected with the generator.
Figure 6:
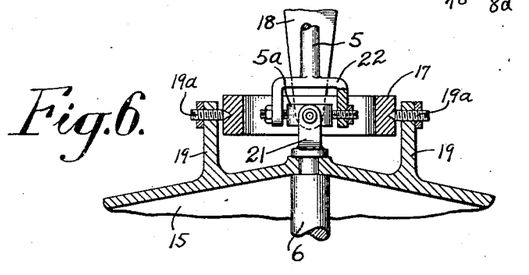
Figure 6 is a fragmentary detail view on the line 6—6 of Figure 5 showing a universal suspension and concentric drive for pendulously mounting the generator armature and for driving it.

A description will now be given of the generator improvement shown in Figures 5 and 6, the object being to provide brush orienting means to turn the brushes independently of the armature and support only the brushes, and there being other objects as will appear.

The generator includes a winding 3 on an armature core $3^a$ which is rotated in the earth's magnetic field instead of, as in the ordinary electric dynamo, in a field artificially induced by magnets of some character. The armature 3 may be driven by any suitable means such as a wind mill 4 fixed on a drive shaft 5 to which the armature shaft 6 is connected. As in any electrical generator, rotation of the armature 3 in a magnetic flux induces electric potential in the armature winding which is impressed upon a direction indicating galvanometer or steering meter 7 electrically connected by wires 8 to commutator brushes 9 and 10 engaging the commutator 11.

The armature shaft 6 may be stabilized and hence maintained substantially vertical at all times irrespective of the tilting of the craft upon which the generator is installed. To this end the armature is pendulously supported from a housing cover or support 12 which is adapted to be secured to the craft so that no matter what angle with the horizontal the support 12 and craft assumes the axis of the armature 3 will always be substantially vertical. The armature 3 rotates within a relatively stationary casing 15, the armature and casing being pendulously suspended together as a unit.

To afford the desired freedom of movement and to support the generator so that the casing and armature will both sway together under the influence of gravity and gyroscopic force produced by the revolving armature 3 and thus maintain a substantially vertical position, a connection or generator support means capable of universal movement is provided to suspend the casing 15 and with it the armature 3 from the support 12. This universal support comprises a gimbal ring 17 which is pivotally connected at diametrically opposite points 18ª to arms 18 depending from the support or cover 12 Figure 5 for a housing which has been removed, and is also pivotally connected, at diametrically opposite points 19ª in a plane at right angles to the plane of the first pivots, to arms 19 extending upwardly from an armature casing 15 Figure 6.

Immediately above the armature case 15 the armature shaft end 6 has secured to it, as by a pin 20, a bifurcated member or knuckle 21 which supports the generator and forms one of the elements of a universal joint 21—22 between the drive shaft 5 and the armature shaft 6, the other elements being a knuckle 22 on the end of drive shaft 5 and a center block 5ª to which the knuckles join. The universal joint has its pivots points disposed coincident with the gimbal pivots already explained. The gimbal 17 supports the weight of the pendulous generator while the universal 5ª drives the armature through the gimbal.

According to this form of the invention, it is proposed to adjustably turn or orient the commutator brushes 9 and 10 with respect to a normally vertical axis, i. e. in azimuth. In this instance, the vertical axis is assumed to be that of the armature 3 and commutator 11. For that purpose, the brushes 9 and 10 are mounted on a gear 23, which is formed with a central opening 24 to receive the armature shaft 6 and commutator 11. This gear is rotatably mounted upon the case 15. About the opening 24 of the gear is formed with a flange 25 which is adapted to extend inside and through a round opening forming a bearing 26 in the bottom of the casing 15 against which the gear 23 turns. Supporting the gear in rotational relation with the casing 15 is a flat ring 27 which may be screwed to the flange 25. Thus the flange 25 and ring 27 mount the gear 23 for orientation underneath and coaxially with the armature and in relation thereto.

It is obvious that separate wires 8ª and 8ᵇ are required to connect the respective commutator brushes 9 and 10 with the steering meter or deviation indicator 7. Brushes 9 and 10 are therefore each electrically connected respectively to a slip-ring 29 and slip-ring 30 by electric conductors 31 and 32, the slip-rings being coaxial with the armature axis and interposed between the rotary brush carrier or mounting means and the stationary housing. These conductors 31 and 32 are shown as embedded in a plate or disc 28 of insulating material which is secured to the bear 23 to carry slip-rings 29 and 30 and brushes 9 and 10 and serves to insulate each from the other. This form of brush mounting structure is by way of example only since other forms may be used. The commutator brushes 9 and 10 with their cages and with insulator 28, the gear 23, and the ring 27, are all anchored together as one piece and turn together by reason of a brush-gear setting transmission adapted to rotate the gear 23 while the generator case 15 is stationary.

The brushes 9 and 10 are adjustably rotated in aszimuth about the commutator 11 by rotation of the gear 23 which is turned by a compass direction controller such as a crank handle 33 and a transmission means now to be described. The crank 33 is fixed on a flexible shaft 34, thus providing operating means 33—34 for driving the brush carrying gear 23 as will be explained. The shaft 34 is connected with a worm 35 in mesh with a worm wheel 36 fixed on a shaft 37 which is journalled in a bearing in the housing 12. It is obvious that the compass controller crank 33 may be disposed at any location adjacent to or remote from the brush carrying gear 23. A drive connection 42 is established between the rotary brush mounting gear means 23 and the shaft 37 so that the crank 33 orients the brushes 9 and 10.

The direction controller 33 includes an indicator of direction such as a compass card or dial 50 fixed on the shaft 34 and adapted to turn with this shaft and indicate direction at a lubber's line 52. The controller compass dial 50 is marked similar to the card or dial of an ordinary magnetic compass with the four cardinal points of a compass imprinted thereon. The dial 50 turns uniformly at the same rate and through the same angular distance as the brushes 9 and 10 are oriented by reason of appropriate gear ratios for this purpose. Hence the dial 50 indicates at 52 the angle of orientation of the brushes 9 and 10 so that the pilot or navigator sets the brushes by observing the controller dial 50, the degree of orientation of the commutator brushes being directly indicated in terms of direction at the controller dial lubber index 52.

As the armature case and hence the gear 23 sways or precesses with movement of the craft on which it is mounted, or as the cover 12 and craft pitch and roll in relation to the stabilized generator 15, provision is made in the driving connection between the shaft 37 and the gear 23 whereby the positive drive of gear 23 remains effective. A universal joint 38 connects shaft 37 to a shaft 42ª telescoping in the shaft tube 42, and another universal joint 39 connects shaft tube 42 with a shaft 40 carrying a pinion 41, which meshes with and turns the brush mounting gear 23.

Between these two universal joints 38 and 39 the telescoping drive shaft acts to transmit motion or driving torque from the controller 33 to the gear 23 by reason of a shaft pin 43 fixed on the shaft 42ª and sliding in the slot 42ᵇ thereby affording a variable length drive shafting between the relatively movable shafts 37 and 40.

Wires 8ª and 8ᵇ leading to the steeirng meter 7 are connected to movable contact means interposed between gear 23 and the armature housing, this contact means including rotating slip-ring brushes 44 and 45 engaging the respective slip-rings 29 and 30. Brushes 44 and 45 are mounted in a stationary brush block 48 anchored in a cover plate 46 in which the end of the armature shaft 6 is journalled and which serves as a closure for the brush-gear housing 47 preferably forming a part of the generator case 15. Thus the commutator brushes 9 and 10 may turn relatively to and around the commutator 11 while current is taken from the generator at the stationary brush block 48 of the movable contact means interposed between the rotating gear and stationary case.

In operation, the wind mill 4 (an electric motor may be used) spins the armature in the earth's field which impresses potential on the deviation or steering meter indicator 7. Initially and to properly install the generator, a heading of N may be determined, the vehicle is set on N, and the controller dial 50 is set at N on the lubber line 52. The controller dial 50 is then disconnected from the brush setting transmission means and the commutator brushes 9 and 10 are oriented about the commutator 11 until a condition of zero potential shows on the indicator 7. The dial 50 is now reconnected to shaft 34 and the compass system is ready for service.

Thereafter it is only necessary to turn the controller handle 33 until the dial 50 shows a desired heading for the craft, and the craft is then steered by observing the deviation indicator 7 and hand 7ª which stands at zero "0" when the craft is on that direction shown at the controller index 50. During the setting of the dial 50 to the desired direction, the brushes 9 and 10 are simultaneously turned to a corresponding position of no potential for the new direction and the hand 7ª on the steering meter 7 will return to zero position when the craft is turned to head in the desired direction shown on the controller dial 50.

It will thus be seen that an earth inductor compass system has been provided including a pendulously supported generator armature, about the commutator 11 of which, the current collecting brushes 9 and 10 may be adjustably turned in azimuth or oriented by a remote instrumentality, namely the compass controller 33 which operates an indicating device 50 to show the position of the brushes with respect to the commutator in relation to the earth's magnetic field, and to directly indicate in terms of compass direction on dial 50 the said position.

It will be seen that the gear reduction transmission means between the compass controller 33—50 and brush setting gear 23 (including gears 35 and 36 and extensible shafting 42ª with drive pinion 41) constitute a telemetric drive connection by which the brush setting function may be effected at a point remote to the generator. Thus the drive pinion or worm 35, which may be built into the generator as a component part thereof, is adapted to be connected with any suitable form of controller driving or operating means by which the brush control transmission on the generator is operated. My improved generator is adapted to have its brush gear setting transmisison connected with the compass controller through shafting 34 of any appropriate length; and all these functions and considerations are performed and are true of and for the inductor generator and compass controller as shown in my former application 542,937, just as much so in that earlier invention as here in a later and improved form.

What is of further manifest importance, is that my invention involves the measurement of the angle of orientation of the commutator brushes, and the value of that measurement is read from the index 52 on the compass directional controller dial 50 in terms of direction. The controller dial 50 and brushes 9 and 10 turn at the same angular rate and so it follows in this improved form, as well as in that of my earlier case 542,937, that the commutator brushes of the generator are measured as to their angular movement about the vertical and there exists means to visibly disclose that measurement in terms and degrees of direction.

Furthermore there is in this improved form, as is also true of my former case 542,937, universal supporting means in the gimbal 17 from which hangs the generator 15 and thus the craft and the cover plate 12 as a generator base move in function above the generator as it gyroscopically stabilizes itself beneath the support 12. As the armature revolves in the earth's field, it produces potential to effect movement of the direction indicator or steering meter hand 7ª in case the craft gets off the course; and furthermore it produces gyroscopic force by which the generator inherently stabilizes itself and to establish or maintain, together with the brush gear controller 33, the armature inductor plane in a zero potential position, i. e. to maintain the inductor plane of the armature perpendicular to a plane defined by the armature axis and the direction of the earth's flux.

To emphasize an outstanding feature of the invention in the generator, I refer further to the rotary mounting means supporting the generator brushes and by which the brushes are adjustable in azimuth whether the entire generator is oriented or merely the brushes are oriented. The principle is the same in both or all forms of my invention. There is the gear 23 which is a base or turntable carrying the brushes to orient them through any desired angle about a normally vertical axis, the gears 41 and 23 forming a brush setting gear transmission included as a part of the rotary brush mounting means, and any suitable telemetric operating means 33—34, drive connection, or proximate drive connection is geared in mesh with the gear 23 to actuate the said rotary brush mounting means from a distance and these are some of the features which are new.

In older or known inductor compass generators, there was no provision by way of a gear transmission included in the brush carrier for adjustably turning or orienting the brushes at the will of the operator from a point remote to the generator, and there was no provision for visibly measuring the angle of brush orientation and converting that measurement into terms of direction. In other words, the earlier inventions and attempts at inductor compasses did not provide a brush-gear setting transmission as a part of the generator per se; and did not provide a compass direction controller per se; and did not provide a telemetric drive or any other drive per se, or operating means, by which a commercial form of earth inductor compass system or combination could be brought together and utilize the earth's flux lines for determining direction. In both forms of my invention I provide movable contact means, such as slip rings and brushes, by which current is transmitted from the generator brushes quite independently of their oriented positions.

My invention in inductor compass generators provides these various novel elements to form an important element in the electric or inductor compass combination and by which the great practical difficulties heretofore experienced are now overcome; these and others are the features of my invention. My invention also provides improvements in the various elements such as the generator, and does more. My invention resides as well in the new elements on and for a compass generator to-wit, a brush setting gear transmission adapted to operatively connect with a compass controller operating means 33—34 or 98—99 and by which the value of the angular movement of the commutator brushes turning about the vertical is shown on the compass dial 50 or 144 of the compass systems and also resides in the means to stabilize the armature 151 or 3ª of the generators, and working together these elements control the inductor plane of the armature.

I have disclosed two main forms of my inductor compass generator. In both forms, the brushes are susceptible broadly to orientation. I have shown how the brushes are carried for orientation, either dependent on or independent of the armature suspension means allowing for stabilization of the armature as well as orientation of the brushes to control the inductor plane as desired. In both cases the principle and purpose of orientation and stabilization are the same. A similar brush setting transmission is built into both types of generators by which they are adapted to be connected to a compass controller operating shaft of any suitable type to drive the brush setting transmission and hence orient the brushes bearing on a commutator.

It is noteworthy that in my earlier invention as well as in the later form, the commutator brushes are carried with or on a rotary base and for this purpose a relatively large gear is used. While in service or flight, the brushes are usually turned in azimuth less than a complete turn for ordinary steering functions, it is nevertheless desirable to provide a brush carrier which is free to make a full turn or turns about the commutator axis because in initial installation and adjustment, there is need of complete freedom of the brushes so they may be turned back and forth to find a zero position for the inductor plane for a given compass heading on the controller dial in any form of the invention.

It is new in inductor compass generators to provide brush carrying means affording this complete freedom of brush rotation for in old and known forms, there was no provision for subjecting the brushes to a complete turn or turns and no brush orienting transmission was available by which to carry into effect this most essential function which I have discovered in connection with my invention in navigation instruments. Cooperating gears are preferably used for these purposes because they afford a simple means of effecting the purposes named and remain stationary after the brushes are set, in effect clamping the brushes in fixed position but ever ready at the will of an operator for readjustment and change in angular relation to the earth's flux lines, these being essential features among others which make for the success of my invention.

In that form of the generator invention wherein the brushes are mounted directly on a gear for support and orienting motion independently of the armature, I preferably locate the brush-gear adjacent the commutator so that the brushes readily reach and bear on the commutator. It facilitates this plan of the invention to provide the large gear 23 with the large commutator opening 24 through which the commutator reaches so as to bring the brushes in relatively close position to the commutator. Other plans of structure may well be used to attain these ends.

Another feature of my compass generator which I have devised to simplify the structure, economize in space and weight, and which contributes to the success of the invention, relates to the coaxial disposition of all moving parts; and in the several forms of construction representative of my discoveries I resolve all the axes of moving parts into a normally vertical position, and make the several axes coincident and vertical. These considerations are true of the structure in my earlier application as well as in the improvements as will be understood by study of my drawings and specilcations throughout. Although my apparatus is relatively simple, this simplicity was ultimately reached by the efforts attendant upon the bringing together of all movable or rotating parts to act about a common axis and preferably about a vertical axis.

There is a common axis for the armature and drive means therefor entering through the stationary generator bases 160, 12, and 15, for the brush orienting gear 160 and 23, for the movable contact slip-rings in both forms, and for the stabilization of the armature on a normally vertical axis common to the axes of the parts just named.

In other words, the journal pin 149 as well as drive shaft 5 are coaxial with the brush-gear 155 and brush-gear 23; the slip-rings 179 and 180, as well as 29 and 30, are coaxial with the armature and brush gear axes; and the armature axis M—M as well as axis of armature 3ª are also coaxial with the several other axes named. In this way all rotating parts turn about a common axis in the generators disclosed. The gimbal supports 153 and 17 are also coaxial with all other axes named and likewise the universal drive 158 and 21 operate concentrically or coaxially with their respective gimbals. However the armature axis M—M or axis of the other armature 3ª need not necessarily be coaxial with the brush-gear and slip-ring axes as is apparent in my earlier application.

While I prefer in these particular generators disclosed to group all rotating parts about a common axis as in and for the purposes above described, other forms of generator construction may be resorted to. In view of these considerations, my principle readily lends itself to various forms of construction so that I may manufacture for the trade a type of generator most suited for particular kinds of craft for it is understood by those skilled in the art that different kinds of craft or vehicles varying in size, speed, weight and motions in travel present different problems in navigation requiring separate consideration for each kind, and the principle of my invention affords a basis for producing a compass most suited for the particular craft in question.

This question of principle common to and inherent in all my compass generator and compass controller inventions is a formula which I discovered by continued experimentation and trial of many kinds of compasses and by which I am guided in laying out the design and construction of a compass most suited to a particular craft. This is true because in following my formula or principle, I can produce a compass generator (as shown in my earlier patent application as well as in this improvement), the mean position of the commutator brushes of which, in relation to the inductor plane of the armature, can be controlled or maintained in a non-potential position with reference to the direction of the earth's flux, and simultaneously resolve or indicate directly in terms of direction, on a distantly located compass dial 144 or 50, that non-potential position; all this despite the fact that I may or may not desire, because of limitations or requirements in structural design, to stabilize the brushes and/or group the rotating parts about a common axis, or stabilize the commutator either with or independently of said commutator brushes.

In other words I have discovered how, with a controller and stabilizer, to establish, control or maintain the inductor plane of the armature perpendicular to a plane defined by the armature axis and the direction of the earth's flux, and to make this established or controlled relationship read plainly in ordinary terms of heading or direction on a compass card, and this without limitation as to the particular element oriented or stabilized.

The common axis for all moving parts lends itself well to the compact arrangement of the movable contact means in the slip-rings and brushes interposed between the stationary base 160, 12, and 15 and rotary mounting means 155 and 23 in the several generators. In my earlier patent application, the commutator brushes 177 and 178 are located distinctly from the movable contact means in the slip-rings 179 and 180 and require the long electrical connection 167 therebetween. However, in my later improvements I closely relate and mount the commutator brushes 9 and 10 adjacent to the movable contact brushes 44 and 45. In this improved way it is possible to use short conductors or electrical connections 31 and 32 between the two brush systems, and this arrangement enables the conductors 31 and 32 to be embedded in the insulating disk 28 carried with the gear or embedded in the brush orienting gear itself since in some cases the brush orienting element 23—28 is made entirely of insulating material.

The brush orienting gear 23—28 is concealed within the housing 47 together with all parts accessory to the taking off of electric potential through the wires 8ᵃ and 8ᵇ. Although the commutator 11 and its brushes 9 and 10 are entirely independent of each other as regards rotating supporting means therefor, and although the brushes 9 and 10 turn around the commutator independently of its high speed revolution, current is nevertheless taken from the generator by connecting the steering meter wire 8 to the stationary brushes 44 and 45 disposed concentrically with the axis of the brush gear 23—28 and armature.

The drive means for the brush gear 23 includes its pinion 41 within the case 47, and there is preferably provided, at some suitable point in the transmission, a releasing locking means, such as the worm 35, interconnecting with the larger brush gear 23 by which it is held stationary and hence the commutator brushes are held stationary against displacement. The locking function is inherent in the worm and is releasable upon turning of the transmission, and thus the worm or any other suitable means acts to positively hold the direction controller dial and commutator brushes in set portion so the operator may rely on the ability of all brush-gear setting and controlling parts to remain in set position.

I have constructed and arranged the commutator brushes 9 and 10 together with the slip-rings 29 and 30 upon the rotating brush carrier 23—28 to provide a compact assembly, and the two conductors 31 and 32 are comparatively short. The two brush systems 9—10 and 44—45 are closely associated and the gear insulation 28 separates all contact making parts. Thus I have disposed certain essential working parts including the electric transmission brush system within a small space at one end of the generator and in close relation to the commutator where they function most efficiently and requiring a minimum number of parts.

What I claim is:

1. A compass generator including commutator brushes and means adapting them to be adjustably oriental through any desired angle about a normally vertical axis, rotary mounting means carrying the brushes for movement aforesaid, an indicator on the rotary mounting means to show the angle through which the brushes are oriented, and drive means operatively connected with the mounting means to orient the brushes and to turn the indicator.

2. A compass generator comprising, an armature and including a commutator having current-collecting means, rotary mounting means carrying the current-collecting means and including a gear transmission by which orientation of the current collecting means is effected, said transmission including an interconnected worm and worm wheel by which the gear transmission locks against accidental movement to hold the current-collecting means in fixed position, and an indicator dial turned with the rotary mounting means to show the angle through which the current-collecting means are oriented.

3. A compass generator comprising, an armature and including a commutator having current-collecting means, rotary mounting means carrying the current-collecting means and including a transmission by which orientation of said current-collecting means is effected, and means including a gimbal and an armature frame supported to stabilize the armature.

4. A compass generator comprising, an armature and including a commutator and brushes, universally pivoted supporting means carrying the armature and brushes to afford stabilization thereof and including a brush setting transmisison means by which orientation of the brushes is effected, said armature producing gyroscopic force to effect stabilization thereof aforesaid; and drive means interconnected with the brush setting transmission means to orient the universally pivoted supporting means and hence the armature, the commutator and brushes.

5. A compass generator comprising, an armature, a commutator having current-collecting means therefor, means for establishing the inductor plane of the armature perpendicular to a plane defined by the axis of said armature and the direction of the earth's flux to secure null potential position for the generating parts, and said means including a stabilizer for the armature and a rotary-mounting means for the commutator and its current-collecting means.

6. A compass generator comprising, an armature, a commutator and brushes bearing thereon, means for establishing the inductor plane of the armature perpendicular to a plane defined by the axis of said armature and the direction of the earth's flux; and said means including gimbal-support means for stabilizing the armature shaft in a predetermined position, and a brush setting transmission carrying the brushes and adapting them for connection with a direction controller for orientation at the will of an operator.

7. A compass generator comprising, an armature mounted on a shaft and including commutator and brushes bearing thereon, means for establishing the inductor plane of the armature perpendicular to a plane defined by the axis of said armature and the direction of the earth's flux, and said means including gimbal-support means for stabilizing the armature shaft in a predetermined position, and a brush setting gear transmission including a large gear on which the brushes are mounted and a small gear adapted to be connected with a compass controller.

8. A compass generator comprising, an armature including commutator and current-collecting means therefor, means for establishing the inductor plane of the armature perpendicular to a plane defined by the axis of said armature and the direction of the earth's flux; and said means including gimbal-support means for stabilizing the armature in a predetermined position, rotary mounting means carrying the current-collecting means for orientation independently of the commutator, and a transmission means cooperating with the rotary mounting means to orient the current-collecting means.

9. A compass generator comprising, an armature having a normally vertical axis including commutator and brushes bearing thereon, means for establishing the inductor plane of the armature perpendicular to a plane defined by the axis of said armature and the direction of the earth's flux; said means including gimbal-support means to stabilize the vertical armature on its vertical axis aforesaid; and brush orienting means including a gear carrying the brushes and provided with a central aperture into which the commutator is received, and a drive means interconnected with the gear to orient the brushes.

10. A compass generator comprising a base, an armature and commutator, current-collecting means adapted to be adjustably turned through any desired angle about a normally vertical axis, rotary mounting means journaled in relation to the base and carrying the current-collecting means for movement aforesaid, drive means operatively connected with the rotary mounting means for turning the current-collecting means, and movable contact means interposed between the base and rotary mounting means and connected with the current-collecting means by which current is taken therefrom.

11. A compass generator comprising, an armature including a commutator and current-collecting means, rotary mounting means carrying the current-collecting means and including a gear by which the current-collecting means are adapted to be oriented through a complete turn to a zero potential position, a stationary member supporting the generator and mounting means, and movable contact means interposed between the stationary member and rotary mounting means.

12. A compass generator comprising, a housing base, an armature including a commutator having current-collecting means carried by the base, rotary mounting means journaled on the base and carrying the current-collecting means and including a gear by which orientation of the current-collecting means is effected, means locking the gear against movement to hold the current-collecting means in set position, and slip-ring contacts interposed between the housing base and rotary mounting means.

13. A compass generator comprising, an armature including a commutator and brushes, rotary mounting means carrying the brushes, a gear transmission to orient the rotary mounting means by which the brushes are rotated through any desired angle about a normally vertical axis, said gear transmission including an interconnected large and small gear by which the rate of brush rotation is made relatively slow, a generator base carrying the rotary mounting means, and movable contact means interposed between the generator base and large gear.

14. A compass generator comprising, an armature including a commutator and brushes, rotary mounting means carrying the brushes, a gear transmission to orient the rotary mounting means by which orientation of the brushes is effected, a base on which the rotary mounting means is journaled, said transmission including an interconnected worm and worm wheel by which the gear transmission locks against accidental movement to hold the brushes in fixed position, insulating means carrying the aforesaid commutator brushes on the worm wheel, and slip-ring contact means interposed between the base and worm wheel and electrically connected with the brushes.

15. A compass generator comprising, an armature including a commutator and brushes, rotary mounting means carrying the brushes, a transmission to orient the rotary mounting means by which orientation of the brushes is effected, gimbal-support means to stabilize the armature and commutator axis in a predetermined position, a stationary base in which the rotary mounting means and transmission is journaled, and movable contact means interposed between the rotary mounting means and stationary base and electrically connected with the brushes.

16. A compass generator comprising, an armature including a commutator and brushes, supporting means carrying the armature and brushes and including a brush setting transmission means by which orientation of the brushes is effected, stabilizing means for the armature comprising a universal support for the same to establish the armature in a predetermined position, and operating means interconnected with the brush setting transmission means to drive the latter, a base in which the supporting means is journaled, and slip-ring contact means interposed between the supporting means and base to transmit current from the brushes independently of their oriented position.

17. A compass generator including commutator brushes adapted to be turned at will through any desired angle about a vertical axis, a brush setting transmission including a large driven gear carrying said brushes and a small driving gear interconnected therewith to slowly orient the brushes, and slip-ring contact means connected with said brushes and cooperating with the large gear from which current is taken from the generator.

18. A compass generator comprising, an armature including commutator and current-collecting means therefor, means for establishing the inductor plane of the armature perpendicular to a plane defined by the axis of said armature and the direction of the earth's flux; and said means consisting of gimbal-support means for stabilizing the armature in a predetermined position, and a gear transmission including a large gear on which the current-collecting means are mounted and a small gear adapted to be connected with a compass controller; and movable contact means connected with the current-collecting means to take current from the generator including slip-rings, and brushes bearing on the slip-rings.

19. A compass generator comprising, an armature including commutator and brushes bearing thereon, means for establishing the inductor plane of the armature perpendicular to a plane defined by the axis of said armature and the direction of the earth's flux; and said means consisting of gimbal-support means for stabilizing the armature in a predetermined position, rotary mounting means carrying the brushes for orientation independently of the commutator, and transmission means cooperating with the rotary mounting means to orient the brushes; a stationary base with which the rotary mounting means is rotatably carried, contact means including slip-rings with brushes interposed between the base and rotary mounting means and connected with the armature by which current is taken from the generator; and means driving the armature coaxially with the rotary mounting means and slip-rings.

20. A compass generator comprising, an armature having a shaft operating in a normally vertical position including a commutator and brushes, means for establishing the inductor plane of the armature in a non-potential position; said means consisting of gimbal-support means to stabilize the armature shaft on its vertical position, brush orienting means including a gear carrying the brushes and provided with a central aperture fitting over the commutator, drive means engaging the gear to orient the brushes; a stationary base and journal means carrying the brush orienting means therewith, armature drive means extending through the base coaxially with the gear, and stationary current take off means including movable contacts connected with the brushes.

21. A compass generator comprising, an armature including a commutator and brushes, a brush carrier and operating means to turn it coaxially about the commutator, slip-rings and brushes disposed coaxially with the armature and brush carrier and a stationary support carrying the brushes in contacts with the slip-rings, an electric connection between the commutator brushes and slip-ring brushes, drive means connected with the armature coaxially with the brush carrier and slip-rings, and a universal pendulous support concentric with the axis of the drive means carrying the armature.

22. A compass generator comprising, an armature including commutator and brushes disposed on a normally vertical axis, a brush orienting transmission including a gear turning about said vertical axis and the brushes mounted thereon for orientation, movable contact means turning about said vertical axis including stationary contacts from which current is taken from the generator, drive means connected with the armature through said vertical axis, a gimbal support disposed concentrically with the vertical axis by which the armature is pendulously supported, and a universal joint included in the drive means coaxial with the gimbal ring.

23. A compass generator comprising; an armature disposed on a normally vertical axis and including a commutator and brushes bearing thereon, and means pendulously supporting the armature; drive means connected with the armature and disposed in the vertical axis aforesaid; brush orienting means including a member on which the brushes are carried for movement through any desired angle about said vertical axis, and means rotatably supporting said member for orientation relatively to and about the commutator; operating means connected with the member to effect orientation of the brushes at the will of an operator; and releasable locking means to secure the brushes in fixed position.

24. A compass generator comprising, an armature including commutator and brushes, a brush-gear carrying the brushes and provided with a central opening acting as a bearing and through which the commutator is received, means on which the brush-gear bearing is rotatably mounted, operating means to turn the brush-gear coaxially about the commutator, slip-rings and brushes disposed coaxially with the armature and brush-gear and a stationary support carrying the brushes in contact with the slip-rings, an electric connection between the commutator brushes and slip-ring brushes, drive means connected with the armature coaxially with the brush-gear and slip rings, and a universal pendulous support concentric with the axis of the drive means carrying the armature.

25. A compass generator comprising, an armature including commutator and brushes disposed on a normally vertical axis, a brush orienting transmission including a gear turning about said vertical axis and the brushes mounted thereon for orientation, movable contact means disposed adjacent the commutator brushes and turning about said vertical axis including stationary contacts from which current is taken from the generator, electric conductors carried with the gear and connecting the brushes with the movable contact means, drive means connected with the armature through said vertical axis, a gimbal support disposed coaxially with the vertical axis by which the armature is pendulously supported, and a universal joint included in the drive means coaxial with the gimbal ring.

26. A compass generator comprising, an armature disposed on a normally vertical axis and including, drive means therefor, a commutator, brushes, and means pendulously supporting the armature for stabilization thereof; brush orienting means including a member on which the brushes are carried for movement through any desired angle about said vertical axis, said member being provided with an aperture into which the commutator is received, and bearing means journaled in the aperture supporting the member for orientation in relation to and about the commutator; a drive means connected with the member to effect orientation of the brushes at the will of an operator; and means to maintain the brushes in fixed position but releasable by operation of the drive means.

27. An inductor compass generator including an armature, commutator and current-collecting means, driving means for rotating the armature in the earth's field, and universally pivoted supporting means carrying the armature to utilize gyroscopic force to stabilize said generator; rotary mounting means carrying the aforesaid current-collecting means for orientation through any desired angle at the will of an operator, and transmission means cooperating with the rotary mounting means for orienting the current-collecting means and adapted to be connected with and operated from a remotely located controller; and an indicator, reading in terms of direction, of the angle through which the current-collecting means are oriented, correlated with the rotary mounting means.

28. A compass generator comprising, a base, and means supporting a pendulously suspended non-rotating case therefrom, a generator including an armature rotatable in the case and including a commutator, means to drive the armature and commutator brushes engaging the commutator, and means to orient the brushes with respect to the non-rotating case.

29. A compass generator comprising, a pendulously suspended armature including a shaft and commutator carried thereby, a rotatable gear concentric with the armature shaft, brushes carried with the gear and engaging the commutator, slip-rings carried with the gear, electrical connections between the brushes and the slip-rings and carried on the gear, a stationary brush engaging each slip-ring, and means to rotate the gear and orient the brushes around the commutator.

30. A compass generator comprising, a case, means pendulously supporting the case, an armature in the case including a shaft and commutator carried thereby, a gear concentric with the armature shaft rotatably carried within the case and provided with an aperture to fit over the commutator, an insulating plate carried with the gear and also fitting over the commutator, brushes carried with the plate engaging the commutator, slip-rings carried with the plate concentrically with the gear, conductors connecting the brushes and the slip-rings, and stationary brushes carried by the case engaging the slip-rings.

31. A compass generator comprising, a case and a universal support to penduulously suspend it, a drive shaft and means to drive it, an armature in the case including a shaft and a comutator carried thereby, a universal joint between the drive shaft and the armature shaft, a gear rotatably carried within the case and an insulating plate carried with the gear, brushes carried with the insulating plate and engaging the commutator, slip-rings carried with the insulating plate, electrical connections between the brushes and the slip-rings, respectively, a stationary brush carried by the case engaging each slip ring, and a drive pinion carried by the shaft and meshing with the gear and including means to connect with a shaft drive for remote control of the brushes.

32. A compass generator comprising, a shaft carrying an armature and commutator, an insulating member provided with an aperture fitting over the shaft and commutator, means supporting the member for rotation in relation to the armature, brushes mounted on the member bearing on the commutator, a stationary base supporting the generator, current take off means interposed between the base and rotatable insulation member and including movable and stationary contacts attached to the insulation member and base, and transmission drive means including an extensible member carried at one end on the base and connected at its other end with the member to turn the brushes.

33. A compass generator comprising, a case, a shaft carrying an armature and commutator within the case, the case being provided with an opening into which the commutator is received, a gear also provided with an opening into which the commutator is received and including means journaling the gear in the case opening for rotation about the commutator, brushes carried with the gear bearing on the commutator, electric connections including movable contact means connected with the brushes to take current from the generator, and mechanical transmission means to turn the gear and hence orient the brushes.

34. In an earth inductor compass generator, an armature and a commutator connected thereto and adapted to revolve in the earth's field to produce potential, brushes bearing on the commutator, rotary-brush-mounting means arranged to turn about a vertical axis and on which the commutator brushes are carried and to which a direction controller means is adapted to be connected whereby the commutator brushes are oriented, and a universal support operatively suspending the armature whereby the gyroscopic force produced by the revolving armature causes inherent stabilization thereof.

In testimony whereof I affix my signature.

MORRIS M. TITTERINGTON.